(12) United States Patent
Greenwood, III et al.

(10) Patent No.: US 8,649,644 B2
(45) Date of Patent: Feb. 11, 2014

(54) CABLE JACKET WITH VARIABLE PERIMETER BOND

(75) Inventors: Julian L. Greenwood, III, Hickory, NC (US); Jason C. Lail, Conover, NC (US); Keith H. Lail, Connelly Springs, NC (US); Reginald Roberts, Taylorsville, NC (US); Richard S. Wagman, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 253 days.

(21) Appl. No.: 13/133,650

(22) PCT Filed: Dec. 11, 2009

(86) PCT No.: PCT/US2009/067658
§ 371 (c)(1),
(2), (4) Date: Aug. 11, 2011

(87) PCT Pub. No.: WO2010/068857
PCT Pub. Date: Jun. 17, 2010

(65) Prior Publication Data
US 2011/0286706 A1     Nov. 24, 2011

Related U.S. Application Data

(60) Provisional application No. 61/121,711, filed on Dec. 11, 2008.

(51) Int. Cl.
*G02B 6/44* (2006.01)

(52) U.S. Cl.
USPC .................................................. 385/107

(58) Field of Classification Search
None
See application file for complete search history.

(56) References Cited

U.S. PATENT DOCUMENTS

| | | | |
|---|---|---|---|
| 4,729,629 A | 3/1988 | Saito et al. | 350/96.23 |
| 4,932,746 A | 6/1990 | Calzolari et al. | 350/96.23 |
| 5,649,041 A | 7/1997 | Clyburn, III et al. | 385/109 |
| 5,689,601 A | 11/1997 | Hager et al. | 385/100 |
| 5,751,879 A | 5/1998 | Graham et al. | 385/103 |
| 5,930,431 A | 7/1999 | Lail et al. | 385/100 |
| 6,122,424 A | 9/2000 | Bringuier | 385/100 |
| 6,137,936 A | 10/2000 | Fitz et al. | 385/113 |
| 7,630,605 B2 | 12/2009 | Bringuier et al. | 385/100 |
| 8,180,190 B2 | 5/2012 | Bringuier et al. | 385/109 |
| 2002/0009272 A1 | 1/2002 | Parris | 385/109 |
| 2004/0223707 A1 | 11/2004 | Parsons et al. | 385/100 |
| 2011/0135816 A1 | 6/2011 | Burns et al. | 427/163.2 |

FOREIGN PATENT DOCUMENTS

EP          527266 B1       2/1993   ............... G02B 6/44

*Primary Examiner* — Jerry Rahll
(74) *Attorney, Agent, or Firm* — Russell S. Magaziner (57) ABSTRACT

The bond between an armor and a cable covering jacket is controlled by introducing intervening material at the interface of the layers along selected bond regions. The intervening material can comprise particulate matter or a strip of material introduced at selected locations of the armor perimeter to allow ease of access at the selected regions.

24 Claims, 5 Drawing Sheets

CABLE JACKET WITH VARIABLE PERIMETER BOND

PRIORITY APPLICATION

This application is a continuation of International Application No. PCT/US09/67658 filed Dec. 11, 2009, which claims the benefit of priority to U.S. Provisional Application No. 61/121,711, filed on Dec. 11, 2008, both applications being incorporated herein by reference.

RELATED APPLICATIONS

This application is related to U.S. application Ser. No. 12/214,461, filed Jun. 19, 2008 and entitled "FIBER OPTIC CABLE HAVING ARMOR WITH EASY ACCESS FEATURES", U.S. application Ser. No. 12/150,656, filed Apr. 30, 2008 and entitled "FIBER OPTIC CABLE AND METHOD OF MANUFACTURING THE SAME", U.S. application Ser. No. 61/118,196, filed Nov. 26, 2008 and entitled "METHODS OF CONTROLLING BONDING AND ARTICLES FORMED THEREFROM", International Application PCT/US09/65760, filed Nov. 24, 2009 and entitled "METHODS OF CONTROLLING BONDING AND ARTICLES FORMED THEREFROM", and U.S. application Ser. No. 61/139,187, filed Dec. 19, 2008 and entitled "METHODS OF CONTROLLING BONDING AND WATER BLOCKING IN CABLES," the entire contents of these applications being hereby incorporated by reference as if presented herein.

BACKGROUND

Fiber optic cables are used to transmit data in indoor and outdoor environments. It is common for outdoor cables to include an armor for protection from rodent attack, crush, and/or for providing a generally robust cable design. The armors can be metallic, plastic, e.g. layers, and are typically covered by a cable jacket covering that is extruded over the armor.

In order to access the optical fibers within armored cables, the jacket is first stripped from the armor, and then an access point is formed in the armor, generally by breaching the armor. Conventional metallic armors typically include a coating of polyethylene or some other coating material. During manufacture of a cable, an intermediate liquid layer such as glue is applied to the armor coating before extruding the jacket over the armor. The glue is applied to form a release layer that prevents a strong thermoplastic bond from forming between the armor coating and the jacket, which could render the jacket difficult or impossible to separate from the armor.

While the intermediate glue layer allows the jacket to be separated from the armor, the bond between jacket and armor may still be relatively strong, rendering separation difficult. Glue is also relatively messy, expensive, and difficult to employ in a manufacturing environment. For example, glue must be heated to at least its melt temperature before application to the armor surface, and must be routed through sealed conduit that is heated in a controlled fashion so that the glue does not solidify during transport. Excess glue that does not adhere to the armor surface must also be regularly cleaned from the manufacturing line.

SUMMARY

According to a first embodiment, a method of making an armored fiber optic cable comprises providing a fiber optic cable core, at least partially enclosing the fiber optic cable core in armor, applying particulate matter to an exterior surface of the armor, and after applying the particulate matter, forming a covering over the armor. The particulate matter is applied to the exterior of the armor such that a first bond region and a second bond region of the armor perimeter are formed. The bond force between the armor and the covering is less in the first bond region than in the second bond region. In some applications, the force per unit of area required to pull the covering in the first bond region away from the armor can be less than half of the force required in the second bond region.

According to one aspect, the particulate matter provides controlled bonding of the covering to the armor and allows for ease of access in the first bond region. Where the interface of the covering with the armor includes particulate matter, removal of the covering is facilitated by cohesive failure of the particulate matter when the covering is pulled from the armor. The bond between covering and armor can be relatively strong in the second bond area to provide strength and stability to the cable.

According to a second embodiment, a method of making an armored fiber optic cable comprises providing a fiber optic cable core, at least partially enclosing the fiber optic cable core in armor, paying off a strip of material, and forming a covering over the armor and over the strip of material. The strip of material is applied to the exterior of the armor such that a first bond region and a second bond region of the armor perimeter are formed. The bond force between the armor and the covering is less in the first bond region than in the second bond region due to the presence of the strip of material.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Reference will now be made in detail to the present embodiments, examples of which are illustrated in the accompanying drawings. Whenever possible, the same reference numerals will be used throughout the drawings to refer to the same or like parts.

Figure 1:
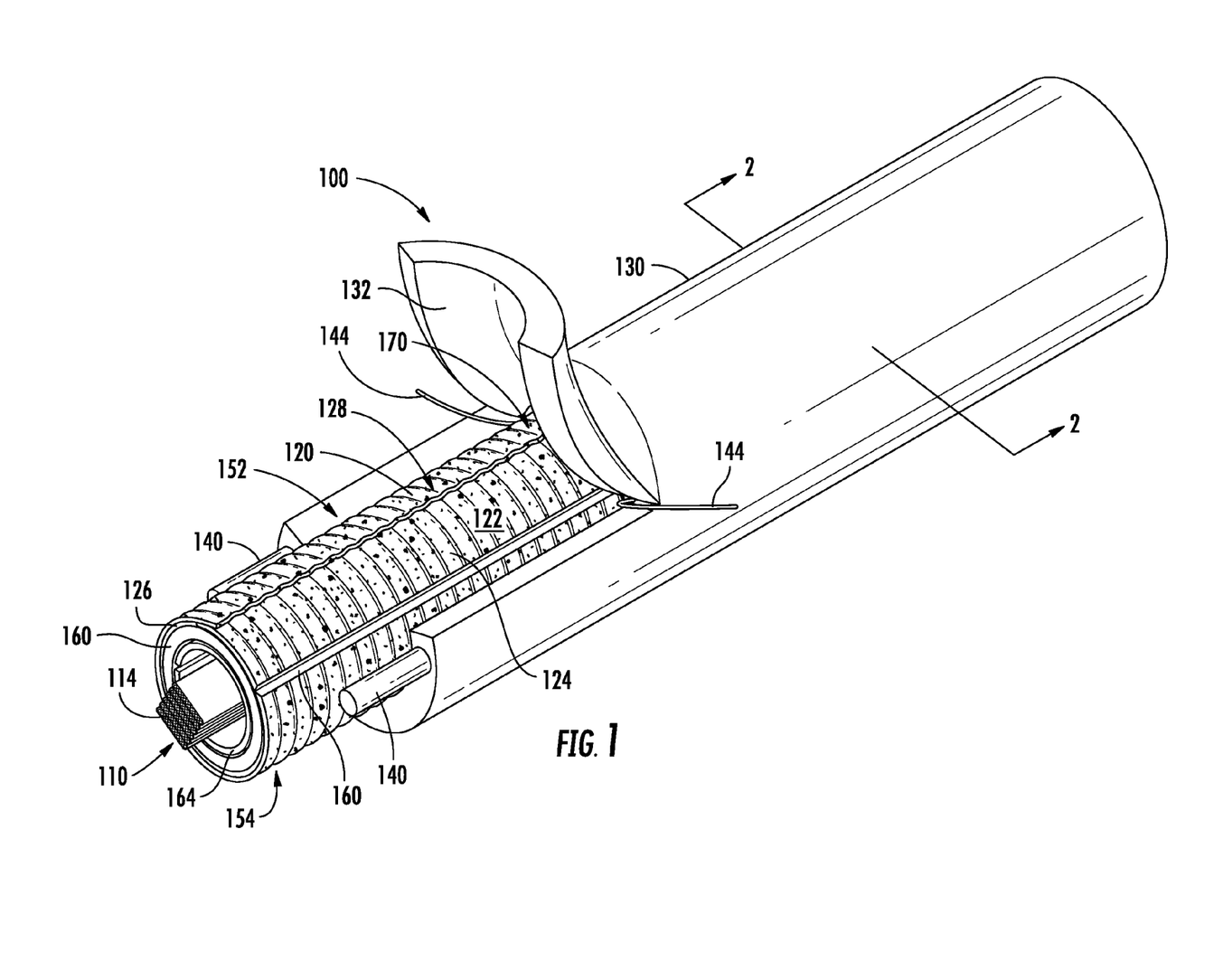
FIG. 1 is a partial cutaway view of a cable according to a first embodiment with a portion of the cable covering pulled away from the cable armor.
Figure 2:
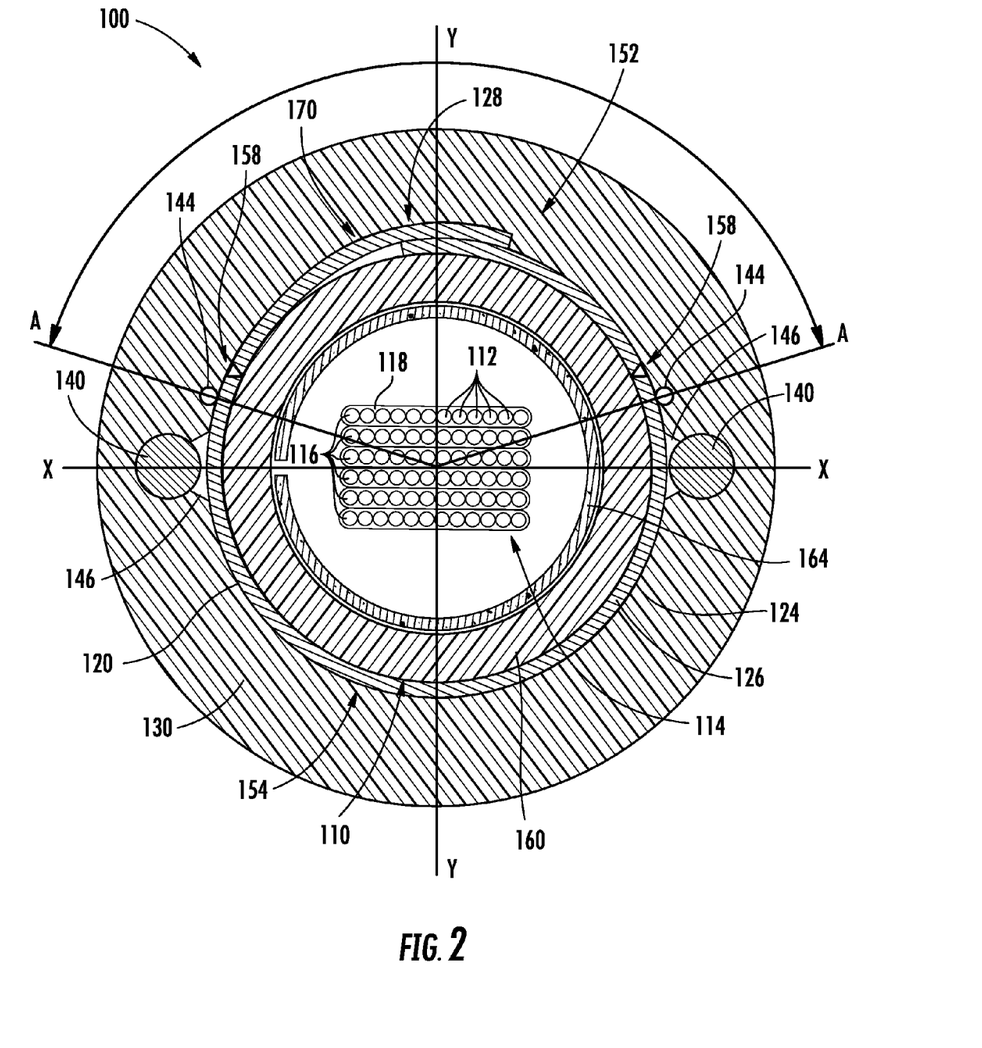
FIG. 2 is a section view of the armored cable of FIG. 1 taken along line 2-2 in FIG. 1.

FIG. 1 is a partial cutaway view of a cable 100 according to a first embodiment. FIG. 2 is a section view of the cable 100 taken on line 2-2 in FIG. 1. The cable 100 generally comprises a core 110, armor 120 having an exterior, abutting surface 122, and a covering 130 surrounding the armor 120 and having an interior, abutting surface 132 in contact with the exterior surface 122 of the armor 120. In FIG. 1, the cable 100 is shown with the covering 130 partially removed as if a craftsman were accessing the cable 100. One or more strength elements 140 can be included in the cable 100, such as a pair of strength elements 140 extending along the length of the cable. One or more ripcords 144 can also be provided adjacent to the armor 120 and embedded in the covering 130. The core 110 includes a polymeric buffer tube 160 and a dry insert 164 disposed within the interior of the armor 120 and extending along the length of the armor 120. As shown in FIG. 1, the ripcords 144 can be pulled back to assist in removing the covering 130. A second dry insert (not illustrated) can be located between the exterior of the buffer tube 160 and the armor 120.

Referring to FIGS. 1 and 2, in the exemplary embodiment, the core 110 also includes one or more optical fibers, each optical fiber having the ability to convey fiber optic communications. The exemplary core 110 can therefore be referred to as a "fiber optic cable core". In the illustrated embodiment, the optical fibers 112 are arranged as a stack 114 of a plurality of optical fiber ribbons 116, each optical fiber ribbon 116 having a row of twelve optical fibers 112 encased in a ribbon matrix 118. Other arrangements of optical fibers are possible. The dry insert 164 can be, for example, a longitudinally extending foam tape. If desired, the buffer tube 160 and dry insert(s) can be omitted to provide ease of access to the ribbon stack 114.

The armor 120 surrounds and protects the core 110 and has a tubular shape. The interior of the armor 120 can abut an exterior surface of the core 110, or an intervening dry insert (not shown) may be present. In this specification, the term "armor" does not necessarily indicate a metallic element, and allows for the use of dielectric armors, for example. The armor 120 can include a coating 124 comprising a polymer layer formed over a base armor material 126, the coating 124 serving as the abutting surface 122 of the armor. Alternative and/or additional layers may also be included in the armor 120, so that the armor 120 is actually an armor laminate. The armor 120 is formed about the core 110 and joins at an overlap or seam 128. The term "armor" is used in this specification for simplicity of description and is intended to encompass armor laminates as are generally known in the art. The structure of an exemplary armor is discussed in detail below with reference to FIG. 4.

Still referring to FIGS. 1 and 2, the covering 130 surrounds and tightly abuts the armor 120 and can be referred to as a "jacket" or "cable jacket." In the exemplary embodiment, the covering 130 is a polymer material formed over the armor 120 by an extrusion process. The polymer used to form the covering 130 can be materials such as, for example, plastics. In the exemplary embodiment, the polymer covering 130 is UV-resistant medium density polyethylene (MDPE). The covering 130 can be generally described as comprising a polymer or as "polymeric", but amounts of other non-polymers can be included in the covering. In this specification, the term "polymeric" allows for the inclusion of additives, and indicates that the covering comprises at least 60%, or at least 70% polymer material.

As shown in FIG. 2, during extrusion of the covering 130 over the armor 120, a longitudinally extending void or channel 146 may be formed between each strength element 140 and the armor 120. In this specification, the term "void" does not mean an absence of all matter, but instead indicates a region between the strength element and armor where no polymer jacket material has infiltrated during extrusion of the covering 130.

According to one aspect of the present invention, the outer perimeter of the armor 120 can have varying degrees of bonding with the covering 130 at different points along the perimeter of the armor 120. As shown in FIG. 2, the cable has a first bond region 152 and a second bond region 154. The seam 128 may be present within the first bond region 152. The first bond region 152 is the interface of the covering 130 with the armor 120 between the reference lines A, although the regions will not typically be clearly defined. The bond between the armor 120 and the covering 130 in the first bond region 152 is generally weaker than the bond in the second bond region 154, which is illustrated as the remainder of the perimeter of the cable 100, although there may be some variation in bond strength due to varying amounts of particulate matter within the regions. In FIG. 2, the weaker first bond region 152 generally corresponds to the armor-covering interface extending between the ripcords 144. When the ripcords 144 are pulled back to access the interior of the cable 100, the portion of the covering 130 in the first bond region 152 can be pulled back relatively easily, as shown in FIG. 1. One or more locations of the perimeter of the armor tube may be provided with longitudinally extending scores 158, on either side of the seam 128, to facilitate access to the optical fibers in the core 100.

The degree of bond in the first and second bond regions 152, 154 may be selected to provide ease of access via the weaker bond region 152 and to provide stable cable properties via the stronger bond region 154. The strength of the bonds between the armor 120 and the covering 130 can be varied along the armor perimeter by changing the nature of the interface between armor and covering in the first bond region 152. For example, referring to FIGS. 1 and 2, an intervening material 170 can be introduced between the armor 120 and the covering 130 in the first bond region 152 that is not present in the second bond region 154, or is present in smaller quantities than in the first bond region 152. Various methods of creating the individual bond regions 152, 154 are discussed in detail below.

The second bond region 154 is relatively strong, and can be produced such that the cover 130 cannot be easily separated from the armor 120 in the second bond region 154. For the purposes of this specification, the coating 124 on the armor 120, if present, is considered to be part of the armor because suppliers often pre-coat the bulk materials used to form such armors. Low density ethylene is a common coating material. Polypropylene is another coating material. If a typical plastic cable jacket material (e.g. MDPE) is extruded directly onto a polyethylene armor coating, a strong thermoplastic bond is formed between the armor coating and the resultant plastic covering. Therefore, one method of forming the second bond region is to leave the armor 120 exposed, without adding any intervening material, when extruding the polymeric covering 130 over the armor 120. The second, strong perimeter bond region 154 of the armor 120 to the covering 130 provides rigidity and superior mechanical properties to the cable 100. The strong bond region 154 can also be formed if an oil coats the armor 120 prior to forming the covering 130 over the armor. Oils are commonly used as a coating to aid in the forming of armors, and a residual oil coating on the armor does not prevent a strong thermoplastic bond from forming between the armor 120 and the coating 130.

The bond between armor and covering in the first bond region 152 is weaker than the second bond region 154 and can be obtained by introducing the intervening material 170 between the armor 120 and the covering 130 in the first bond region 152. According to the first embodiment, bonding of the covering 130 to the armor 120 in the first bond region 152 is controlled using an application of particulate matter 170 at the interface of the covering 130 and the armor 120. The bond-controlling particulate matter 170 according to the first embodiment is applied at the interface of the armor 120 and the covering 130 in order to interrupt, prevent and/or weaken the thermoplastic bonding at a plurality of locations, and thereby facilitate separation of the covering 130 from the armor 120 in the first bond region 152.

Figure 3:
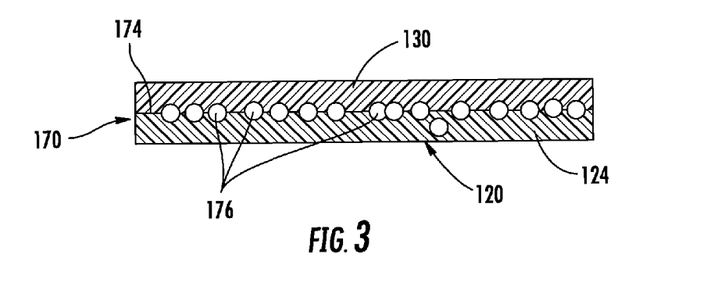
FIG. 3 is a longitudinal section view of the interface of the armor and covering of the cable of FIG. 1.

FIG. 3 is a schematic illustration of a method of controlling the bond in the first bond region 152 using an application of particulate matter 170. The section in FIG. 3 can be described as a schematic representation of a highly magnified longitudinal section of a small portion of the interface of the covering 130 and the armor 120, particularly at the coating 124 of the armor in the first bond region 152. In practice, the entire perimeter section of the first bond region 152 can include an application of particulate matter 170 as shown in FIG. 3. An adherent material layer 174 can be located at the interface of the covering 130 and the armor 120. The adherent 174 can be, for example, a layer formed from a liquid applied to the armor 120 during manufacture of the cable 110. The adherent 174 helps the particulate matter 170 to adhere to the armor 120 exterior surface before the covering 130 is formed over the armor. While the adherent material 174 is illustrated on the surface of the armor 120 in FIG. 1, materials such as oils will likely be wholly or substantially incorporated into the covering 130 during extrusion.

The particulate matter 170 can be comprised of a plurality of individual inorganic or organic particles 176 distributed over the surface 122 of the armor 120 in the first bond region 152. The density and arrangement of the particulate matter 170 can be selected to provide a desired degree of bonding between the covering 130 and the armor 120 in the first bond region 152. Suitable inorganic particulates include mineral particulates such as Talc-Hydrated Magnesium Silicate (Talc), clay (e.g., hydrated aluminum silicate), and superabsorbent polymers (SAP) such as are used in fiber optic cable water-blocking applications. An example of a suitable mineral particulate is VANTALC 2500® available from R. T. Vanderbilt Company, Inc. Another suitable particulate is a crosslinked sodium polyacrylate sold under the trade name CABLOC GR-211, available from Evonik, Inc. of Greensboro N.C. Either Talc or clay could be mixed with a small percentage of highly hydrophilic SAP particulates to provide water-blocking properties. Corrosion-resistant absorbent powders can be used as a portion of or may comprise all of the bond-controlling particulate matter. In one embodiment, a "salt water SAP" is used when the strength elements are formed from metals such as steel. Salt water SAP is less affected by ions released from rusting metals which can reduce the efficacy of standard superabsorbent polymers. Another way to prevent corrosion is the addition of anti-corrosion additive(s) in the SAP or into the adherent fluid (e.g. oil) applied during manufacturing. The adherent material 174 can be a liquid, such as a liquid of medium viscosity. In the exemplary embodiment, the adherent material 174 is an oil.

Figure 4:
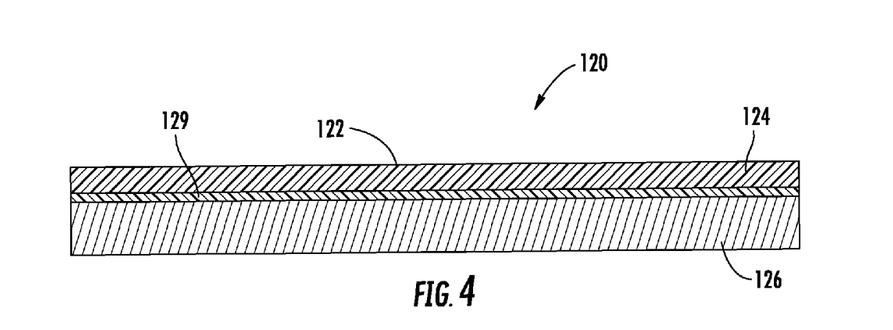
FIG. 4 is a section view of a portion of the armor used in the cable of FIG. 1.

Still referring to FIG. 3, the individual particles 176 of the particulate material 170 interrupt the interlayer bonding at the interface of the covering 130 with the armor 120. The covering 130, which is heated to a fully or partially molten state during application over the armor 120, may form a strong thermoplastic bond with the material of the armor coating 124, which can be a polymer such as polyethylene. The particulate material 170 interrupts the interlayer bond between the coating 124 and the covering 130 at a plurality of locations, the amount of material 170 being selectively variable in order to tailor the desired bond strength. Each particle 176 (which can be formed from an agglomeration of particles) therefore provides an area where the armor/covering bond can fail during separation of the covering 130 from the armor 120. Failure at the armor/particle/covering interfacial locations can be generally referred to as "cohesive failure" because the individual particles 176 can fail internally (i.e., particles break into separate pieces or agglomerated particles break into separate pieces) to facilitate separation in the first bond region 152. The individual particles 176 break or undergo cohesive failure as the covering 130 is separated from the armor 120. The failure at the particulate material 170 can also be "adhesive" in that the bond of the particulate matter 170 with the covering 130 and/or with the armor 120 can be relatively low. As shown in FIG. 4, the individual particles 176 may become at least partially embedded in the covering 130 during extrusion. In FIG. 3, the particles 176 are illustrated as spherical for simplicity of illustration. In practice, the particulate matter can have any shape. The particles 176 may also become at least partially embedded in the armor coating 124.

FIG. 4 is a partially schematic longitudinal section view of a portion of the armor 120 used in the cable of FIG. 1. The armor 120 can include a base armor material layer 126 with the coating 124 adhered to the base armor 126 by an adhesive layer 128. The adhesive layer 128 can be, for example, a film of an adhesive such as ethylene acrylic acetate (EAA). The coating 124 can include additional layers, and can, for example, be a laminate of multiple films. The base armor material layer 126 can include materials such as metals, dielectrics, etc. In the illustrated embodiments, the base armor 126 is metallic and the coating 124 is a polyolefin.

Figure 5:
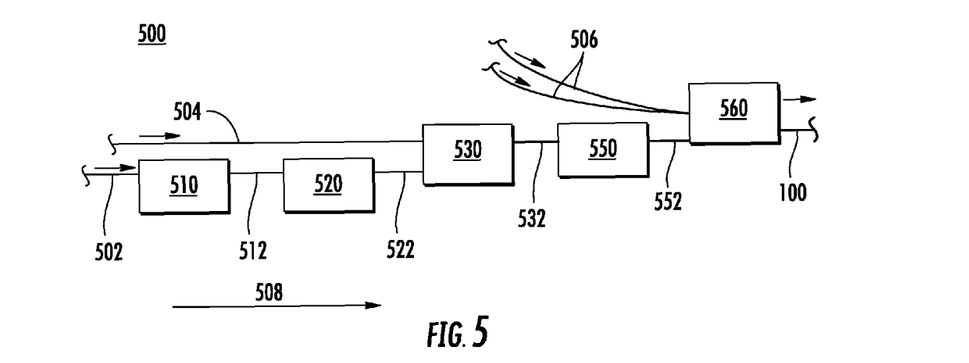
FIG. 5 is a schematic illustration of a manufacturing line suitable for forming cables with controlled bonding between surfaces in the cables.

FIG. 5 illustrates a manufacturing line 500 for forming the cable 100 having variable perimeter bonding of the covering 130. Referring to FIG. 5, a flat sheet 502 of material, a core 504, and one or more strength elements 506 are continuously provided generally along the process direction 508. One or more wires used to form ripcords (not illustrated) may also be provided. The flat sheet 502 can be a coated metallic sheet, for example, and will ultimately form the cable armor 120. The sheet 502 can include a base armor material covered on one side with a coating adhered by adhesive (not illustrated in FIG. 6) that forms the armor coating 124. The flat sheet 502 can be paid off from a roll, for example. The core 504 can be any longitudinally extending element that is to be enclosed within an armor and a covering. In the illustrated embodiment, the core 504 is a fiber optic cable core 110 as illustrated in FIG. 2 including one or more optical fibers arranged as a stack of fiber ribbons and capable of conveying fiber optic signals. The core 504 is paid off of a spool. In the exemplary embodiment, the strength elements 506 are elongate metallic elements of circular cross-section paid off of a spool.

Still referring to FIG. 5, the flat armor sheet 502 is advanced through an applicator 510 where a coating of adherent material is applied to the exterior surface of the flat sheet 502. The adherent can be a liquid such as an oil, and can be applied to the surface of the sheet 502 by a rotating roller that is saturated in the adherent.

The coated sheet 512 then advances into a corrugator 520 that corrugates the sheet 512. The corrugator 520 can be a conventional device, such as a device having two counter-rotating corrugating rollers between which the sheet 512 passes.

The corrugated sheet 522 is advanced into an armor former 530 that forms the armor sheet 512 into a general tube configuration around the core 504 so that it has the configuration shown in FIG. 1. The armor former 530 can be of a conventional configuration, and can include a die of decreasing diameter that continuously concentrically compresses and wraps the armor sheet into a tubular form about the cable core 504. The core 504 is disposed in the interior of the armor tube, with the adherent-coated surface of the armor facing outward. One or more locations of the perimeter of the armor tube may be provided with longitudinally extending scores (not illustrated).

If desired, the combined armor/core assembly 532 can be advanced through an adherent smoother (not illustrated) that smoothes out the adherent on the exterior peripheral surface of the corrugated armor of the assembly 532. One or more high velocity gas jets, for example, can be used to spray air over the adherent to distribute the adherent over the surface of the sheet 522. Brushes may be used alternatively or in addition to gas jets.

The combined armor/core assembly 532 then advances through a particulate applicator 550. The particulate applicator 550 deposits particulate matter onto a targeted area of the perimeter of the surface of the exterior armor tube of the armor/core assembly 532. The adherent coating on the armor of the armor/core assembly 532 helps the particulate matter to adhere to the selected area of the perimeter of the armor/core assembly. The particulate applicator 550 can be a generally enclosed longitudinal cabinet or other structure through which the armor/core assembly 532 travels. Particulate matter can be directed onto one or more targeted regions of the perimeter of the armor/core assembly 532 through, for examples, one or more pressurized nozzles. In the exemplary embodiment, the targeted region of the combined armor/core assembly 532 includes the location of the seam in the armor. Relatively small nozzles can be used to direct streams of particulate matter targeted to specific application or target areas of the surface of the armor/core assembly 532, such as in the first bond region 152 shown in FIG. 2. Particulate matter can also be applied to the armor surface by passing the armor through a chamber that is in communication with a hollow cylindrical drum (not illustrated). Pressurized gas such as atmospheric air is introduced into the drum so as to create a vortex flow within the drum. An aperture is formed in the drum exterior that is in communication with a supply of particulate matter. The vortex flow creates a partial vacuum that draws in the particulate matter, with the particulate matter mixing in the vortex flow. Centripetal acceleration will cause the particulate matter to circulate at or near the outer periphery of the hollow drum, so the chamber through which the armor passes can be at the outer perimeter of the drum so that the particulate matter has a high chance of impinging on the armor and adhering thereto. In order to more effectively distribute particulate matter over the armor, drums can be arranged sequentially along the manufacturing line so that each drum can direct particulate matter towards a particular section (or arc section) of the armor perimeter. For example, one or more drums can be arranged sequentially on the manufacturing line, the drums being arranged in relation to the armor for targeting a specified portion of the perimeter of the armor tube, such as for example the first bond region 152. Alternatively, the particulate matter can be simply dropped or gravity-fed over the top portion of the armor to coat generally the top half of the armor perimeter. Any particulate matter adhering to the bottom half of the armor perimeter would be relatively small in volume and would not excessively weaken the jacket-armor bond.

The armor/core assembly 552 with applied particulate matter is then advanced to an extrusion apparatus 560. The extrusion apparatus 560 works according to conventional principles, in which the armor/core assembly 552 is advanced through an extrusion die where extrudate is introduced around the assembly 552. The molten extrudate forms an extrusion cone around the assembly 552 that eventually shrinks radially or draws down and tightly forms onto the exterior surface of the armor of the assembly 552. Alternatively, the extrudate can be introduced under pressure directly onto the exterior surface of the armor assembly 552 as it passes through the extrusion apparatus 560 and as the extrusion die defines the exterior profile of the jacket. The extrudate forms the tubular covering 130 illustrated in FIG. 1. The molten polymer from the extrusion process provides the heat energy for thermoplastic bonding between the armor coating and the covering 130. The assembly can then be advanced through a cooling device such as a trough, the cooled assembly now constituting the cable 100 (FIG. 1). The cable 100 can then be collected on a take-up device, such as, for example, a take-reel or take-up disc.

As shown in FIG. 5, strength elements 506 can be introduced to the extrusion die of the extrusion apparatus 560. The strength elements 506 can become wholly or partially encased in the covering 130, as shown in FIG. 1. Ripcords (not illustrated) can also be introduced to the extrusion die at the extrusion apparatus 560. The strength elements 506 can be aligned so that they are closely adjacent to or abut the exterior surface of the armor/core assembly at one or more locations. The extrusion process may be such that voids or channels may be left between the strength elements and the armor. The strength elements 506 can be maintained relatively close to the armor during extrusion so that material extruded to form the covering 130 does not infiltrate into the spaces between the strength elements and the armor, which can render removal of the covering 130 difficult. Upstream of the extrusion tooling, the strength elements can be spaced from the armor. Without being bound by theory, Applicants believe that excessive impacts of the strength elements with the armor during processing may cause the overlap point 128 to rotate (e.g., rotate so as to deviate from a nominal clock location in FIG. 2) excessively during manufacture.

Referring back to FIG. 2, particulate matter 170 on the surface 122 of the armor 120 near the strength elements 140 can serve to inhibit and/or prevent the migration of water along the voids 146. If, for example, the particulate matter 170 includes superabsorbent polymer, a mix of such polymers, or a mixture containing such polymers, the absorbent particulate matter will absorb water migrating along the void and block the migration. An example of a particulate mixture suitable for blocking water migration is Talc or clay mixed with SAP particles. SAP alone used as the particulate matter 170 will also block water migration along the voids 146. The SAP can be applied directly in the area beneath the strength elements, for example, using nozzles. A sufficient amount of SAP may also be deposited at the voids 146 if SAP is gravity-fed over the top portion of the armor perimeter as discussed above.

According to one aspect of the invention, the bond force of the first bond region 152 can be substantially lower than the bond force in the second bond region 154. Bond force can be measured as the force, measured in Newtons per square meter or millimeter, required to separate a section of covering from the armor. Because the deposition of particulate matter 170 over the armor may not be exactly uniform, the bond force in the first bond region 152 may also not be uniform. The bond forces discussed in this specification accordingly indicate average bond forces over the respective bond regions 152, 154. According to the present embodiment, the average bond force in the first bond region 152 can be less than 80% of the bond force in the second bond region 154. According to another aspect of the present embodiment, the average bond force in the first bond region 152 can be less than 60% of the bond force in the second bond region 154. If a relatively high concentration of particulate matter 170 is applied to the first bond region 152, the bond force in the first bond region 152 can be less than half or even less than 30% of the bond force in the second bond region 154. The average bond force in the first bond region 152 can be, for example, less than 1.0 N/mm$^2$, while the average bond force in the second bond region 154 can be greater than 1.5 N/mm$^2$ Stated alternatively, in the second bond region 154, the average force required to peel a unit of area of covering 130 away from the armor 120 can be twice or even three times as high as in the first bond region 152.

The first bond region 152 can be selected to occupy a desired portion of the perimeter of the exterior of the armor 120. In FIG. 3, the first bond region 152 occupies slightly less than half, or about 40%, of the perimeter of the armor 120. The first bond region 152 can occupy, for example, between 10% and 60% of the perimeter of the armor 120. In order to improve ease of access to the optical fibers in the core 110, the first bond region 152 can receive a heavy coating of particulate matter 170 that covers nearly all of the armor in the first bond region. Very little or no particulate matter 170 can be directed at the second bond region 154 so that any amounts of particulate matter 170 at the interface of the armor 120 and the covering 130 are incidental. The second bond region 154 therefore defines a very strong thermoplastic bond region where the covering 130 is securely bonded to the armor 120. The bond of the covering 130 to the armor 120 in the first bond region 152 thus becomes less important to the stability and function of the cable 100. However, even when using small directed nozzles or carefully directed powder from vortex flow to apply particulate matter, the direction of the applied particulate matter is not exact so there will be some particulate matter adhering to unintended portions of the armor perimeter, and the border between the first bond region 152 and the second bond region 154 will not be exact.

The flow rate of particulate matter to the particulate applicator 550, and accordingly the total amount of particulate matter incorporated into the cable, can be varied in order to obtain a desired bond strength at the interface of the covering 130 and the armor 120 in the first bond region 152. In general, the total amount of particulate matter incorporated in a cable will be at least 25 mg milligrams per meter in cables having diameters in the range of 5 mm to 35 mm, and with the first bond region occupying less than 210 degrees of the armor perimeter. Higher amounts, such as at least 500 mg/m, or even over 2000 mg/m of cable can be used in cables having diameters in the range of 5 mm to 35 mm. For cables having a diameter of 10 mm or more, amounts over 100 mg/m, or over 1000 mg/m or over 2000 mg/m can be used.

According to another aspect of the invention, the interface of the covering 130 and the armor 120 can be free of materials such as glues, and the abutting surface 132 of the covering 130 directly contacts the surface 122 of the armor 120 except where the particulate matter 170 (and the adherent material 174, if present) is interposed between the armor 120 and the covering 130. The term "abutting" as used herein, accordingly indicates adjacent surfaces of armor and covering layer, allowing for the intervening presence of particulate matter and adherent material, and where the armor coating 124 is considered to be a part of the armor 120.

Figure 6:
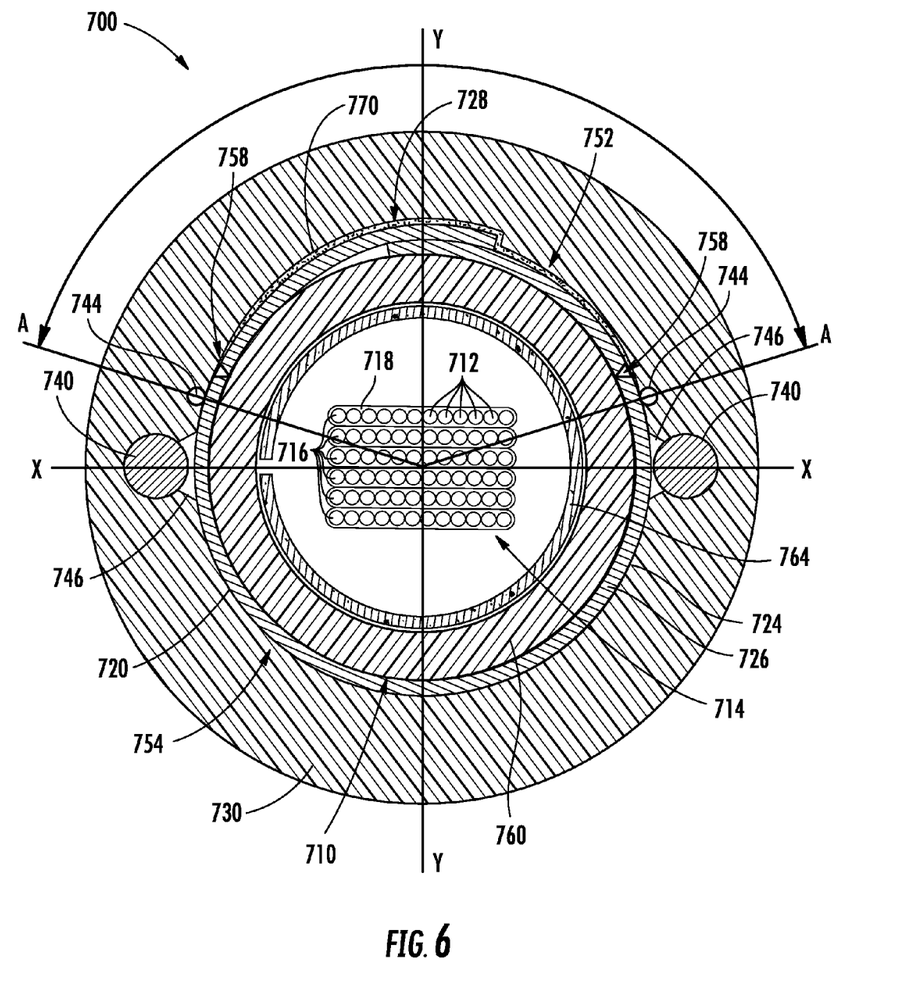
FIG. 6 is a section view of a cable according to a second embodiment of the invention.

FIG. 6 is a section view of a cable 700 according to a second embodiment. The cable 700 is substantially identical to the cable 100 illustrated in FIG. 1, with like elements in FIG. 6 being preceded by a "7" rather than "1." Like the cable 100, the cable 700 generally comprises a core 710, armor 720 having an exterior, abutting surface 722, a covering 730 surrounding the armor 720 and having an interior, abutting surface 732 in contact with the exterior surface 722 of the armor 720, a pair of strength elements 740 and a pair of ripcords 744. The core 710 has one or more optical fibers, each optical fiber having the ability to convey fiber optic communications, a buffer tube 760, and a dry insert 764 arranged around optical fibers arranged in a ribbon stack 714.

As in the cable 100, the cable 700 has varying degrees of bonding with the covering 730 at different locations along the perimeter of the armor 720. In the cable 700, however, a region of reduced bond between the armor 720 and the covering 730 is created by introducing a strip of material 770 extending longitudinally along the length of the cable 700 and lying across a portion of the armor 720.

The strip of material 770 can be, for example, a strip of polymeric material extending along the length of the cable 700 between the armor 720 and the covering 730. The width of the strip 770 generally defines the first bond region 752 between the lines A. The strip 770 is introduced to reduce or even wholly interrupt the formation of a thermoplastic bond between the armor 720 and covering 730 during extrusion of the covering 730. The strip 770 can be made from materials such as, for example, MYLAR®. As shown in FIG. 6, the strip 770 can overlie the seam 728 of the armor 720. The second bond region 754 can be formed in a manner similar to that of the second bond region 154. Examples of materials that can be used to cover an armor seam in a different technological application are disclosed in U.S. Pat. No. 5,930, 431.

Figure 7:
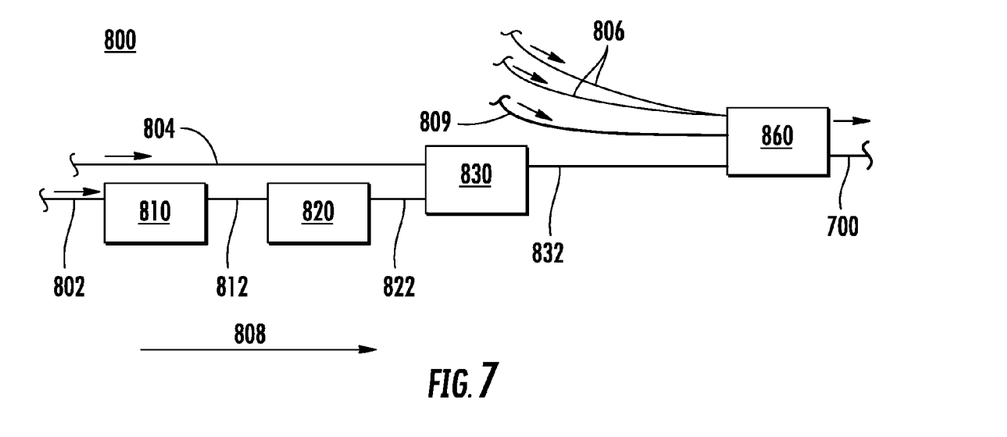
FIG. 7 is a schematic illustration of another manufacturing line suitable for forming cables with variable perimeter bonding.

FIG. 7 illustrates a manufacturing line 800 for forming the cable 700 having variable perimeter bonding of the covering 730. Referring to FIG. 7, a flat sheet 802 of material, a core 804, and one or more strength elements 806 are continuously provided generally along the process direction 808. One or more wires used to form ripcords (not illustrated) may also be provided. The flat sheet 802 can be a coated metallic sheet, for example, and will ultimately form the cable armor 720. The sheet 802 can include a base armor material covered on one side with a coating adhered by adhesive (not illustrated in FIG. 7) that forms the armor coating 724. The flat sheet 802 can be paid off from a roll, for example. The core 804 can be any longitudinally extending element that is to be enclosed within an armor and a covering. In the illustrated embodiment, the core 804 is a fiber optic cable core including one or more optical fibers capable of conveying fiber optic signals. The core 804 is paid off of a spool. In the exemplary embodiment, the strength elements 806 are elongate metallic elements of circular cross-section paid off of a spool.

Still referring to FIG. 8, the flat armor sheet 802 is advanced through an applicator 810 where an oil coating can be applied to the exterior surface of the flat sheet 802. The coated sheet 812 then advances into a corrugator 820 that corrugates the sheet 812. The corrugator 820 can be a conventional device, such as a device having two counter-rotating corrugating rollers between which the sheet 812 passes.

The corrugated sheet 822 is advanced into an armor former 830 that forms the armor sheet 812 into a general tube configuration around the core 804 so that it has the configuration shown in FIG. 7. The armor former 830 can be of a conventional configuration, and can include a die of decreasing diameter that continuously concentrically compresses and wraps the armor sheet into a tubular form about the cable core 804. The core 804 is disposed in the interior of the armor tube, with the oil-coated surface of the armor facing outward. One or more locations of the perimeter of the armor tube may be provided with longitudinally extending scores (not illustrated).

The combined armor/core assembly 832 then advances through an extrusion apparatus 860. The extrusion apparatus 860 works according to conventional principles, in which the armor/core assembly 832 is advanced through an extrusion die where extrudate is introduced around the assembly 832. The molten extrudate forms an extrusion cone around the assembly 832 that eventually shrinks radially or draws down and tightly forms onto the exterior surface of the armor of the assembly 832. The extrudate forms the tubular covering 730 illustrated in FIG. 6. As the covering is extruded about the armor/core assembly 832, a strip of material 809 is laid over the exterior surface of the assembly 832 so that the strip 809 lies between the extrudate and the assembly 832. The assembly can then be advanced through a cooling device such as a trough, the cooled assembly now constituting the cable 700 (FIG. 7). The cable 700 can then be collected on a take-up device, such as, for example, a take-reel or take-up disc. The strip of material 809 forms the strip 770 shown in FIG. 7. The strip 809 can be paid off a roll, for example, and may be guided to a location directly adjacent to the assembly 832 by one or more guide rollers, for example. In the exemplary embodiment, the strip 809 is applied over the seam of the armor covering.

As shown in FIG. 8, strength elements 806 can be introduced to the extrusion die of the extrusion apparatus 860. The strength elements 806 can become wholly or partially encased in the covering 730. Ripcords (not illustrated) can also be introduced to the extrusion die at the extrusion apparatus 860.

According to one aspect of the invention, the bond force of the first bond region 752 can be substantially lower than the bond force in the second bond region 754. According to the present embodiment, the bond force in the first bond region 752 can be less than 80% of the bond force in the second bond region 754. According to another aspect of the present embodiment, the bond force in the first bond region 752 can be less than 50% of the bond force in the second bond region 754. The average bond force in the first bond region 752 can be, for example, less than 1.0 N/mm$^2$, while the average bond force in the second bond region 754 can be greater than 1.5 N/mm$^2$ Stated alternatively, in the second bond region 754, the average force required to peel a unit of area of covering 730 away from the armor 720 can be twice or even three times as high as in the first bond region 752. The bond forces discussed in this specification indicate average bond forces over the respective bond regions 752, 754.

The first bond region 752 can be selected to occupy a desired portion of the perimeter of the exterior of the armor 720 by varying the width of the strip 770. In FIG. 6, the first bond region 752 occupies slightly less than half, or about 40%, of the perimeter of the armor 720. The width of the strip 770 can be varied such that the first bond region 752 can occupy, for example, between 20% and 60% of the perimeter of the armor 720. In order to provide an adequate area for accessing the cable interior, the width of the strip is preferably large enough so that it occupies at least 15% of the perimeter of the armor.

According to another aspect, the interface of the covering 730 and the armor 720 can be free of materials such as glues, and the abutting surface 732 of the covering 730 directly contacts the surface 722 of the armor 720 except where the strip 770 is interposed between the armor 720 and the covering 730.

According to another embodiment, the bond of the covering to the armor can be varied longitudinally along the cable. For example, a selected length of the cable may constitute a region of relatively high bond, and may be adjacent to a region of the cable of relatively low bond. The "rings" of low bond may be used as access points for the cable. Individual rings or "slices" of low bond regions of the cable may be formed by the intermittent application of particulate matter to the exterior of the armor.

Particulates may also be applied to the armor using an electrostatic applicator. For example, the armor can be maintained at a positive charge, and the particulate matter can be oppositely charged and applied to the surface of the armor. This method obviates the need for an adherent.

Particulate matter can also be applied to the surface of the armor by passing the armor through a fluidized bed of particulate matter.

In this specification, the term "particulate matter" is understood to include mixtures of particulates of differing type and/or particle size as well as single composition and size particulates.

The optical fibers employed in the present embodiments may be any suitable type of optical waveguide. Moreover, the optical fibers may be a portion of a fiber optic ribbon, a bundle of optical fibers, or the like.

Alternative particulates include crosslinked sodium polyacrylate available from Absorbent Technologies, Inc. under the tradename AQUAKEEP J550P, copolymers of acrylate and polyacrylamide, graphite, boron, and/or the like.

The coverings 130, 730 can be made from extrudable materials such as, for example, MDPE, UV-stabilized polyethylenes, etc.

The cores 110, 170 can be fiber optic core types such as stranded tube cables, monotube cables, micromodule cables, slotted core cables, loose fibers, tube assemblies, loose and stranded tube, tight-buffered fiber, single tube drop cables or the like. Additionally, the cable cores can include any suitable components such as water-blocking or water-swelling components, flame-retardant components such as tapes, coatings, or other suitable components. Fiber optic cable cores may have any suitable fiber count such as a 6-fiber MIC cable or 24-fiber MIC cable available from Corning Cable Systems of Hickory, N.C. Suitable specific fiber optic core cable types include cables sold under the ALTOS® trademark, SST-RIBBON™, and SST-UltraRibbon™ cables available from Corning Cable Systems.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A method of making an armored fiber optic cable comprising:
    providing a fiber optic cable core, the fiber optic cable core including at least one optical fiber capable of conveying optical signals;
    at least partially enclosing the fiber optic cable core in armor;
    applying particulate matter over at least a part of an exterior perimeter of the armor; and
    after applying the particulate matter, forming a covering over the armor,
    wherein the fiber optic cable has a first bond region occupying a first section of the perimeter of the armor and formed in part by the application of particulate matter, and a second bond region occupying a second section of the perimeter of the armor, a first bond force between the covering and the armor in the first bond region being less than a second bond force in the second bond region, and
    wherein portions of the armor in the second bond region become thermoplastically bonded to the covering during forming of the covering over the armor.

2. The method of claim 1, wherein forming a covering over the armor comprises extruding a polymer covering over the armor.

3. The method of claim 2, wherein the armor comprises a first armor material and a coating over the first armor material.

4. The method of claim 2, wherein at least partially enclosing the fiber optic cable core in armor comprises deforming an armor sheet around the fiber optic cable core.

5. The method of claim 2, wherein the covering is generally tubular.

6. The method of claim 5, wherein the armor is generally tubular.

7. The method of claim 1, further comprising forming at least one score extending longitudinally along the armor.

8. The method of claim 1, wherein the particulate matter overlies a longitudinally extending seam in the armor.

9. The method of claim 1, wherein the first bond region occupies less than 60 percent of the perimeter of the armor.

10. The method of claim 1, wherein providing a fiber optic cable core comprises continuously providing an elongate fiber optic cable core moving along a process direction.

11. A method of making an armored fiber optic cable, comprising:
    providing a fiber optic cable core, the fiber optic cable core including at least one optical fiber capable of conveying optical signals;
    at least partially enclosing the fiber optic cable core in armor;
    applying particulate matter over at least a part of an exterior perimeter of the armor; and
    after applying the particulate matter, forming a covering over the armor,
    wherein applying particulate matter comprises blowing particulate matter through a nozzle, and
    wherein the fiber optic cable has a first bond region occupying a first section of the perimeter of the armor and formed in part by the application of particulate matter, and a second bond region occupying a second section of the perimeter of the armor, a first bond force between the covering and the armor in the first bond region being less than a second bond force in the second bond region.

12. A method of making an armored fiber optic cable, comprising:
    providing a fiber optic cable core, the fiber optic cable core including at least one optical fiber capable of conveying optical signals;
    at least partially enclosing the fiber optic cable core in armor;
    applying particulate matter over at least a part of an exterior perimeter of the armor; and
    after applying the particulate matter, forming a covering over the armor,
    wherein the particulate matter becomes at least partially embedded in the covering during forming of the covering over the armor, and
    wherein the fiber optic cable has a first bond region occupying a first section of the perimeter of the armor and formed in part by the application of particulate matter, and a second bond region occupying a second section of the perimeter of the armor, a first bond force between the covering and the armor in the first bond region being less than a second bond force in the second bond region.

13. An armored fiber optic cable comprising:
    a fiber optic cable core, the fiber optic cable core including at least one optical fiber capable of conveying optical signals;
    armor surrounding the fiber optic cable core;
    a polymer covering surrounding and abutting the armor; and
    particulate matter disposed at an interface of the covering and the armor in a first bond region of a perimeter of the armor,
    wherein the perimeter of the armor also includes a second bond region, a first bond force between the covering and the armor in the first bond region being less than a second bond force in the second bond region, and,
    wherein portions of the armor in the second bond region are thermoplastically bonded to the covering.

14. The armored fiber optic cable of claim 13, wherein the first bond region occupies less than 60 percent of the perimeter of the armor.

15. The armored fiber optic cable of claim 13, wherein the armor comprises a first armor material and a coating over the first armor material.

16. The armored fiber optic cable of claim 13, wherein the particulate matter overlies a longitudinally extending seam in the armor.

17. The armored fiber optic cable of claim 13, wherein the covering is generally tubular and wherein the armor is generally tubular.

18. A method of making an armored fiber optic cable comprising:
    providing a fiber optic cable core, the fiber optic cable core including at least one optical fiber capable of conveying optical signals;
    at least partially enclosing the fiber optic cable core in armor, the armor having a perimeter;
    paying off a strip of material; and
    after paying off the strip of material, forming a covering over the armor,
    wherein the strip of material extends along the length of the cable and is interposed between the covering and the armor, the strip of material in part defining a first bond region occupying at least 15 percent of a perimeter of the armor,
    wherein a first bond force between the covering and the armor in the first bond region being less than a second bond force in a second bond region, and wherein portions of the armor in the second bond region become thermoplastically bonded to the covering during forming of the covering over the armor.

19. The method of claim 18, wherein the covering is generally tubular and the armor is generally tubular.

20. The method of claim 18, wherein less than 40 percent of the perimeter of the armor is covered by the strip of material.

21. The method of claim 18, wherein forming a covering over the armor comprises extruding a polymer covering over the armor.

22. The method of claim 18, wherein at least partially enclosing the fiber optic cable core in armor comprises deforming an armor sheet around the fiber optic cable core.

23. The method of claim 18, wherein the strip of material is a polymer.

24. The method of claim 18, wherein the strip of material overlies a longitudinally extending seam in the armor.

\* \* \* \* \*